(12) United States Patent
Auble et al.

(10) Patent No.: US 11,305,500 B1
(45) Date of Patent: Apr. 19, 2022

(54) EXTERNAL PATCH FOR PUNCTURE OR SLICE ON SIDEWALL OR TREAD SECTION OF A TIRE

(71) Applicant: GlueTread, LLC, Hiram, OH (US)

(72) Inventors: David Auble, Hiram, OH (US); Andrew Auble, Bozeman, MT (US)

(73) Assignee: GlueTread, LLC, Hiram, OH (US)

( * ) Notice: Subject to any disclaimer, the term of this patent is extended or adjusted under 35 U.S.C. 154(b) by 0 days.

(21) Appl. No.: 17/196,078

(22) Filed: Mar. 9, 2021

Related U.S. Application Data

(60) Provisional application No. 62/987,708, filed on Mar. 10, 2020.

(51) Int. Cl.
*B29C 73/10* (2006.01)

(52) U.S. Cl.
CPC .................... *B29C 73/10* (2013.01)

(58) Field of Classification Search
CPC ............................................. Y10T 152/10882
USPC .......................................................... 156/97
See application file for complete search history.

(56) References Cited

U.S. PATENT DOCUMENTS

| | | | | |
|---|---|---|---|---|
| 2,855,014 A * | 10/1958 | Gruber | ............. | B29C 73/10 152/367 |
| 3,029,671 A * | 4/1962 | Clifford | ............. | B29C 73/08 81/15.7 |
| 4,240,852 A * | 12/1980 | Gomberg | ............. | C08J 7/042 156/96 |
| 4,434,832 A * | 3/1984 | Koch | ............. | B29C 73/10 152/370 |
| 4,798,640 A * | 1/1989 | Koch | ............. | B29C 73/10 152/367 |
| 10,035,313 B2 | 7/2018 | Colby et al. | | |
| 2003/0020320 A1* | 1/2003 | Yukawa | ............. | B60B 21/12 301/6.91 |
| 2009/0130361 A1* | 5/2009 | Amal | ............. | B29C 66/232 428/41.8 |
| 2009/0255617 A1* | 10/2009 | Jung | ............. | B29C 73/12 152/367 |
| 2010/0258229 A1* | 10/2010 | Colby | ............. | B29C 73/10 152/367 |
| 2014/0158283 A1* | 6/2014 | Balzano | ............. | B29C 73/10 156/94 |
| 2017/0335143 A1* | 11/2017 | Scheungraber | ............. | C09J 7/383 |
| 2018/0021179 A1* | 1/2018 | Ladd-Kimbrough | ............. | A45D 29/001 602/43 |

* cited by examiner

*Primary Examiner* — Robert C Dye
*Assistant Examiner* — Alexander D Booth
(74) *Attorney, Agent, or Firm* — Renner, Otto, Boisselle & Sklar, LLP

(57) ABSTRACT

A method and/or article is used for repairing of a worn, damaged, punctured or sliced but otherwise functional vehicle tire, for example on the sidewall of the tire. An external patch includes a layer of adhesive applied directly to the slice or puncture and a patch portion that is applied to an exterior surface of a vehicle tire. A separate adhesive affixes the patch portion to the exterior surface of the tire. The adhesive is in contact with a contact surface of the patch portion and also with the exterior surface of the tire. The adhesive may not form a continuous layer, but may hold the patch to the tire by discrete anchor points of adhesive, the anchor points being separated by adhesiveless areas.

20 Claims, 6 Drawing Sheets

EXTERNAL PATCH FOR PUNCTURE OR SLICE ON SIDEWALL OR TREAD SECTION OF A TIRE

This application claims the benefit of U.S. Provisional Application 62/987,708, filed Mar. 10, 2020, which is incorporated by reference in its entirety.

FIELD OF THE INVENTION

The invention is in the field of vehicle tires, and methods and articles for repairing vehicle tires.

DESCRIPTION OF THE RELATED ART

Tires are used to provide wheel support and impact absorption for vehicles. Tires are typically formed of rubber and are pneumatically inflated. Tires are attached to a wheel hub and secured to the vehicle. A typical tire includes interior layers or plies that maintain pneumatic air pressure, and provide additional structural support to the tire. The bead is the portion of the tire that engages the rim, which in turn is attached to the wheel of the vehicle. The sidewalls span the radial distance of the tire from the bead to the tread. The tread is the external contact surface of the tire that encounters the road or other ground surface.

The tread includes a tread pattern that includes lugs and voids. The tread lugs are the portions of the tire that made direct contact with the roadway. The tread voids are the empty spaces between the lugs that enable the lugs to flex and compress while allowing water, snow, and mud to channel away from the lugs, thereby providing traction to the lugs. The tread pattern is defined by the specific shapes and arrangements of the lugs and the voids. Various different tread patterns are employed for various different types of vehicles and are specifically designed for the surface and environment in which the vehicle is expected to perform.

It is a known problem that tires are damaged by sharp objects. These objects often leave punctures or tears in the tire leaving the tire unable to hold a desirable air pressure. Current patches allow the user to pull strips of rubber through a puncture. This creates a plug in the punctured area, allowing the tire to once again hold a desirable amount of pressure. This reduces waste and extends the life of the previously disabled tire.

Another patch method is to remove the tire from the rim and place a patch on the interior of the tire. This patch is generally flat with a layer of adhesive used to adhere the patch to the interior of the tube. This process requires the removal of tires from the wheel hub.

Yet another method to repair uses a patch kit and method for repairing a tear in a sidewall of an off-road vehicle tire includes an inside patch component, an outside patch component, and a compressing component for assembling, joining, and compressing the inner and outer patch components together with the tire sidewall sandwiched there between. This method is not fit to patch a slice or puncture on the main tread portion of a tire.

Yet another method for repairing tire damage is a liquid formula that is injected into the tire. As air is pneumatically added to this tire, the liquid formula is forced out through a puncture. The liquid then hardens and seals the puncture. This method does not work for slices. This method does not work for any damage in the sidewall.

Additionally, if a tire is repaired internally, there is still a weakened portion of the tire that is left exposed on the external portion of the tire. This area is now more prone to further damage since it has already been punctured or sliced once.

Tires of off-road vehicles, such as all-terrain vehicles (ATVs), off-road motorcycles, and golf carts, along with agricultural machines and other work vehicles such as tractors and front end loaders, can receive damage from different factors compared to on-road vehicles. Debris such as antlers, rocks, fence posts, sticks, metal, glass and other items can puncture the sidewall or tread of a tire rendering the vehicle disabled far from a road or professional repair service.

In the event that an ATV or other off-road vehicle with a damaged tire can be safely extracted from an off-road location, there can be considerable expense with replacing or repairing sliced or punctured tires. Further, in the event of such damage to agricultural or other work vehicles such as tractors or front end loaders, such tire damage can result in equipment down time for required maintenance. Such down time can require lost productivity for vehicle operators and other workers relying on the vehicle to perform certain operations. Further, tire replacement can require removal of the wheel from the vehicle and/or the complete removal of the vehicle from the job site so that punctured or sliced tires can be replaced with new or repaired tires at an off-site location. In addition to the cost of new or repaired tires, there are additional material and labor costs associated with remounting.

Further, the replacement of tires results in the scrapping of the old tires. In this manner, additional rubber resources are consumed in producing new or retreaded tires. Also, the old tires are discarded, which can result in additional garbage being added to landfills, contributing to ongoing environmental problems.

The prior art difficulties discussed hereinabove with tires of off-road vehicles that have sliced or punctured but otherwise remain usable can pose safety problems and inconvenience to the vehicle operator. Such difficulties can also result in additional expense being incurred due to lost productivity in a working environment.

SUMMARY OF THE INVENTION

The present invention provides a method and apparatus for enabling tires having a punctured or sliced carcass but otherwise remaining inflated to be repaired in the field of operation. In this manner, the damaged tire can be quickly and inexpensively repaired by the vehicle operator. This can result in maintaining safety for the vehicle operator and recovery of the vehicle. This can also result in a rapid return of a working vehicle to the field of operation, and prevent losses incurred from down time.

According to a first aspect of the present invention, there is provided an external patch that repairs slices and punctures in the sidewall or tread area of the tire. The patch includes a supplemental piece of rubber for repairing a damaged tire. An adhesive layer is first applied to the damaged portion of the tire carcass thus bonding the previously separated areas to each other. Then, an adhesive layer affixes the patch to the exterior surface of a tire carcass covering the recently bonded portion of the tire. The adhesive layer has first engagement with a surface of the damaged tire and a second engagement with the supplied external patch. The patch is applied to the damaged area and pressure is applied for a given amount of time.

According to another aspect of the present invention, a patch is applied to the area of a tire with exposed cords.

There is provided a vehicle tire having exposed cords on the exterior of the tire carcass. The exposed cords are a result of a tire being used on a vehicle for an extended amount of time. The cords are exposed where the lugs of the tire no longer reside or where the valleys have become worn. The patch is placed over the cords to strengthen this area of the worn tire. An adhesive layer bonds the rubber patch to the worn tire. The adhesive layer has first engagement with the surface of the worn tire and a second engagement with the supplied exterior patch. The patch is applied to the damaged area and pressure is applied for a given amount of time.

According to still another aspect of the present invention, there is provided a method of repairing a tire tread of a vehicle tire. The method includes a step of cleaning an area on an exterior surface of a tire tread of a vehicle tire. A step is performed of providing a tread portion having an adhesive layer in contact with a contact surface of the tread portion. Another step is performed of applying the tread portion to the tire tread by placing a tread-facing side of the adhesive layer into contact with the cleaned area of the exterior surface of the tire tread.

An advantage of the present invention is the provision of a method and article that repairs a worn, damaged, sliced or punctured tire without removal of tires from the wheel hub or the vehicle.

Another advantage of the present invention is the provision of a method and article that repairs a worn, damaged, sliced or punctured tire without performing an extensive internal patching process.

Another advantage of the present invention is the provision of a method and article that repairs a worn, damaged, sliced or punctured tire without performing an extensive plugging process.

Still another advantage of the present invention is the provision of a method and article than enables a worn, damaged, sliced or punctured tire to be repaired in the field, improving safety, functionality and operability.

Yet another advantage of the present invention is the provision of a method and article that enables a worn, damaged, sliced or punctured tire on work vehicles to be quickly repaired without removal from a job site, reducing down time and maintaining productivity.

Still yet another advantage of the present invention is the provision of a method and article in which a worn, damaged, sliced or punctured tire can be repaired inexpensively, resulting in savings on the cost of tire replacement.

According to an aspect of the invention, an external patch for repairing a punctured or sliced vehicle tire, the external patch including: a layer of adhesive applied directly into the slice or puncture; and a patch portion configured for application to an exterior surface of a vehicle tire an adhesive layer for affixing the patch portion to the exterior surface of the tire; the adhesive layer having a first engagement side in contact with a contact surface of the patch portion and a second engagement side for contacting the exterior surface of the tire.

According to another aspect of the invention, an external patch for repairing a punctured or sliced vehicle tire, the external patch including: a layer of adhesive applied directly into the slice or puncture; a patch portion configured for application to an exterior surface of a vehicle tire; and an adhesive layer for affixing the patch portion to the exterior surface of the tire; the adhesive layer having a first engagement side in contact with the exterior surface of the tire; and having a second engagement side in contact with a contact surface of the patch portion.

According to an embodiment of any paragraph(s) of this summary, the external patch is in a rectangular shape.

According to an embodiment of any paragraph(s) of this summary, the external patch is in a circular or oval shape.

According to an embodiment of any paragraph(s) of this summary, the external patch has curved edges.

According to an embodiment of any paragraph(s) of this summary, the adhesive layer includes a cyanoacrylate compound.

According to an embodiment of any paragraph(s) of this summary, the patch includes an absorption layer formed by the cyanoacrylate compound in the adhesive layer in a matrix with rubber material in the exterior surface of the tire.

According to an embodiment of any paragraph(s) of this summary, the rubber material is selected from one of polyisoprene or ethylene propylene diene monomer (EPDM).

According to still another aspect of the invention, a vehicle tire, having been repaired, includes: an external patch potion configured for application to the exterior surface of the tire; and an adhesive layer for affixing the external patch portion to the exterior surface of the tire tread, the adhesive layer having a first engagement side for contacting a contact surface of the tire portion and a second engagement side for contacting the exterior surface of the tire.

According to a further aspect of the invention, a vehicle tire, having been repaired, includes: an external patch potion configured for application to the exterior surface of the tire; an adhesive layer for affixing the external patch portion to the exterior surface of the tire tread, the adhesive layer having a first engagement side for contacting the exterior surface of the tire tread and a second engagement side for contacting a contact surface of the tire.

According to a still further aspect of the invention, a method of repairing a punctured or sliced tire of a vehicle, includes the steps of: cleaning an area on an exterior surface of a tire of a vehicle; sanding the tire to ensure a smooth surface; providing a tread portion having an adhesive layer in contact with a contact surface of the tire portion; applying the external patch portion by placing the side of the adhesive layer into contact with the cleaned and prepared area of the exterior surface of the tire tread.

According to an embodiment of any paragraph(s) of this summary, the cleaning the area comprises cleaning a patch where the tire tread is worn damaged, sliced or punctured.

According to an embodiment of any paragraph(s) of this summary, the providing the external patch portion further comprises providing a cyanoacrylate adhesive layer in contact with the contact surface of the patch portion.

According to another aspect of the invention, a method of repairing a tire includes the steps of: applying drops of adhesive around a damaged area of the tire on an external surface of the tire, or on a patch; after the applying, placing the patch on the damaged area, with the drops of adhesive between the patch and the damaged area; and after the placing, applying pressure to the patch for at least a predetermined amount of time.

According to an embodiment of any paragraph(s) of this summary, the applying the drops includes applying dispersed drops of the adhesive.

According to an embodiment of any paragraph(s) of this summary, the applying the drops includes applying from 0.0444 to 0.133 grams of the adhesive per square inch.

According to an embodiment of any paragraph(s) of this summary, the applying the drops includes applying the drops such that 15-40 drops are used per a 1.5 inch×1.5 inch area (6-18 drops per square inch).

According to an embodiment of any paragraph(s) of this summary, the applying the drops includes applying the drops such that 40-60 drops are used per a 1.5 inch×1.5 inch area (18-27 drops per square inch).

According to an embodiment of any paragraph(s) of this summary, the applying the drops includes applying the drops in a grid pattern.

According to an embodiment of any paragraph(s) of this summary, the patch is a flexible patch.

According to an embodiment of any paragraph(s) of this summary, the patch is a rubber material patch.

According to an embodiment of any paragraph(s) of this summary, the rubber material patch has a thickness of approximately ⅛ inch.

According to an embodiment of any paragraph(s) of this summary, the rubber material patch has a thickness of 1/16 inch to ¼ inch.

According to an embodiment of any paragraph(s) of this summary, the rubber material patch is a flexible rubber material patch.

According to an embodiment of any paragraph(s) of this summary, the rubber material patch includes polyisoprene.

According to an embodiment of any paragraph(s) of this summary, the rubber material patch includes ethylene propylene diene monomer.

According to an embodiment of any paragraph(s) of this summary, the placing and the applying pressure includes forming an adhesive layer between the tire and the patch, from the drops of the adhesive.

According to an embodiment of any paragraph(s) of this summary, the placing and the applying pressure includes dissolving and merging the adhesive layer with rubber of the external surface to form an absorption layer.

According to an embodiment of any paragraph(s) of this summary, the absorption layer has a greater tensile strength than material of the patch.

According to an embodiment of any paragraph(s) of this summary, the forming the adhesive layer includes forming a series of discrete anchor points between the patch and the tire, with the anchor points corresponding to respective of the drops, and with adhesiveless space between adjacent of the anchor points.

According to an embodiment of any paragraph(s) of this summary, the applying pressure includes applying pressure for at least 10 to 60 seconds, as the predetermined time.

According to an embodiment of any paragraph(s) of this summary, the damaged area is a sliced area.

According to an embodiment of any paragraph(s) of this summary, the damaged area is a punctured area.

According to an embodiment of any paragraph(s) of this summary, the damaged area is a worn area.

According to an embodiment of any paragraph(s) of this summary, the method further includes, before the applying the drops of the adhesive, cleaning the damaged area.

According to an embodiment of any paragraph(s) of this summary, the method further includes, before the applying the drops of the adhesive, sanding the damaged area.

According to an embodiment of any paragraph(s) of this summary, the method further includes, before the placing the patch, applying additional adhesive in the damaged area.

According to an embodiment of any paragraph(s) of this summary, the damaged area is a sidewall area of the tire.

According to an embodiment of any paragraph(s) of this summary, the damaged area is a shoulder area of the tire.

According to an embodiment of any paragraph(s) of this summary, the damaged area is a treaded area of the tire.

According to an embodiment of any paragraph(s) of this summary, the tire is an off-road vehicle tire.

According to an embodiment of any paragraph(s) of this summary, the tire is an on-road vehicle tire.

According to an embodiment, a kit is used for carrying out the method of any paragraph(s) of this summary.

According to an embodiment of any paragraph(s) of this summary, the kit includes the adhesive and the patch.

According to an embodiment of any paragraph(s) of this summary, the kit includes the sandpaper.

According to an embodiment of any paragraph(s) of this summary, the kit includes application tips for applying the adhesive.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A method and/or article is used for repairing of a worn, damaged, punctured or sliced but otherwise functional vehicle tire, for example on the sidewall of the tire. An external patch includes a layer of adhesive applied directly to the slice or puncture and a patch portion that is applied to an exterior surface of a vehicle tire. A separate adhesive affixes the patch portion to the exterior surface of the tire. The adhesive is in contact with a contact surface of the patch portion and also with the exterior surface of the tire. The adhesive may not form a continuous layer, but may hold the patch to the tire by discrete anchor points of adhesive, the anchor points being separated by adhesiveless areas.

Figure 1:
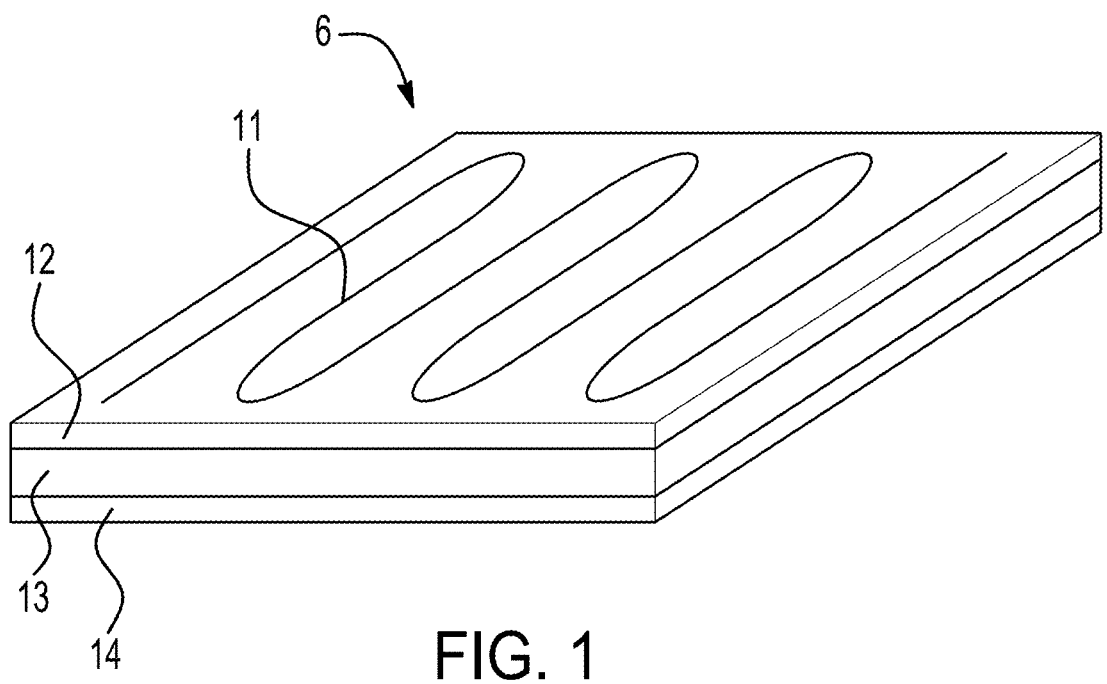
FIG. 1 is a top view of the rectangular external patch.

FIG. 1 shows a rectangular external patch 6. This piece is generally comprised of external portion 14, internal portion 13, application surface 12 and adhesive layer 11 where surface 12 makes direct contact with the damaged tire and is bonded via adhesive layer 11. External surface 14 and internal portion 13 then provide protection to the damaged area of the tire.

Figure 2:
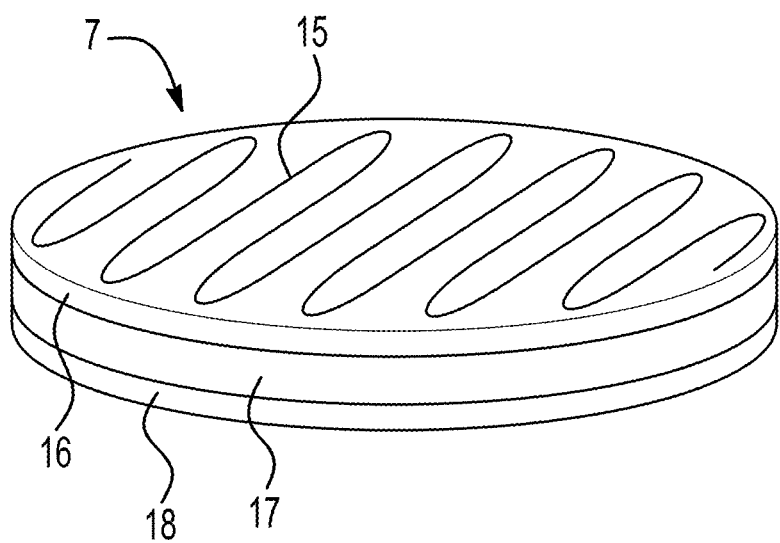
FIG. 2 is a top view of the circular external patch.

FIG. 2 shows a circular external patch that can also be supplied in an oval construction. This piece is generally comprised of external portion 18, internal portion 17, application surface 16 and adhesive layer 15 where surface 16 makes direct contact with the damaged tire and is bonded via adhesive layer 15. External surface 18 and internal portion 17 then provide protection to the damaged area of the tire.

Figure 3A:
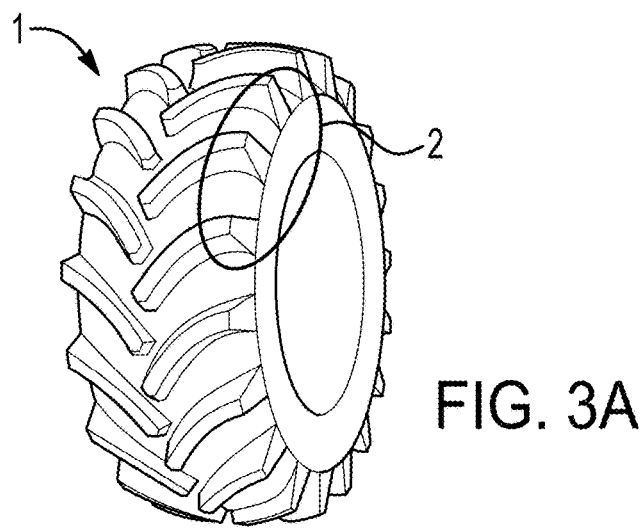
FIG. 3A shows the portion of a tire, further illustrated in FIGS. 3B-3G.
Figure 3B:
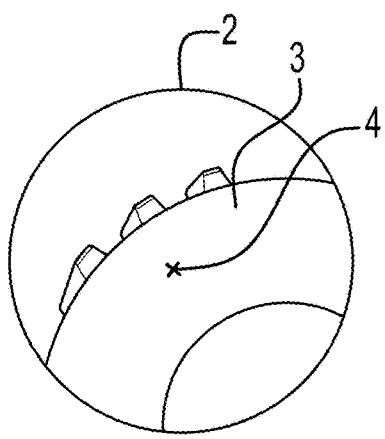
FIG. 3B shows the side view of a tire with a puncture or slice in the sidewall.
Figure 3C:
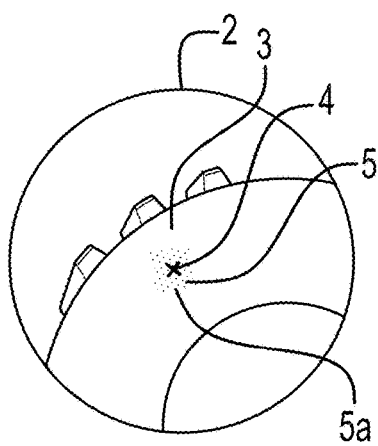
FIG. 3C shows where to apply the adhesive for a rectangular patch to repair a slice or puncture in the sidewall.
Figure 3D:
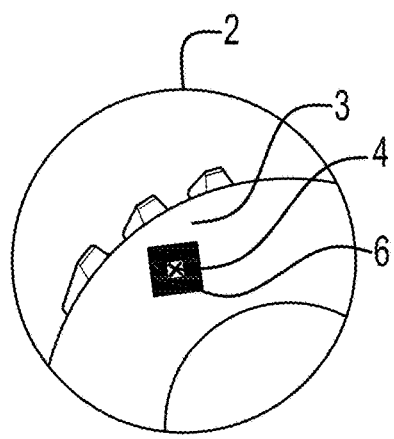
FIG. 3D shows where to place a rectangular patch to repair a slice or puncture in the sidewall.

FIG. 3A shows a tire 1 and the viewing area 2. Viewing area 2 is shown in sequential FIGS. 3B-3D and 3E-3G. In FIG. 3B sidewall 3 is punctured or sliced at point 4. FIG. 3C shows the sidewall 3 is punctured or sliced at point 4, and adhesive 5 is applied at area 5a in a pattern later described in FIG. 5. FIG. 3D shows the sidewall puncture or slice 4 covered with a rectangular external patch 6.

Figure 3E:
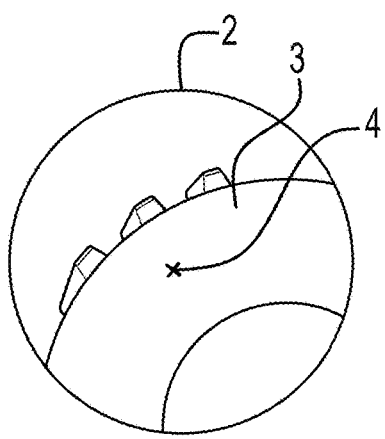
FIG. 3E shows the side view of a tire with a puncture or slice in the sidewall.
Figure 3F:
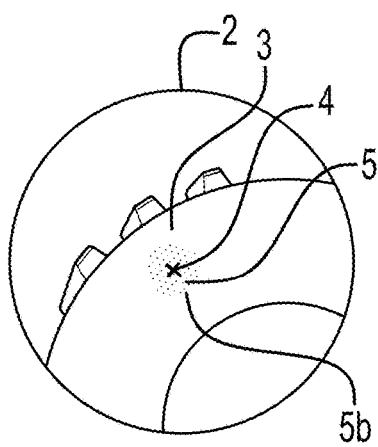
FIG. 3F shows where to apply the adhesive for a circular patch to repair a slice or puncture in the sidewall.
Figure 3G:
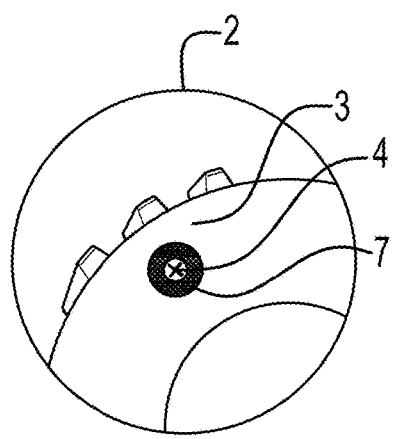
FIG. 3G shows where to place a circular patch to repair a slice or puncture in the sidewall.

In FIG. 3E a sidewall 3 is punctured or sliced at point 4. FIG. 3F shows the sidewall 3 punctured or sliced at point 4, and adhesive 5 is applied at area 5b in a pattern later described in FIG. 6. FIG. 3G shows the sidewall puncture or slice 4 covered with circular external patch 7.

Figure 4A:
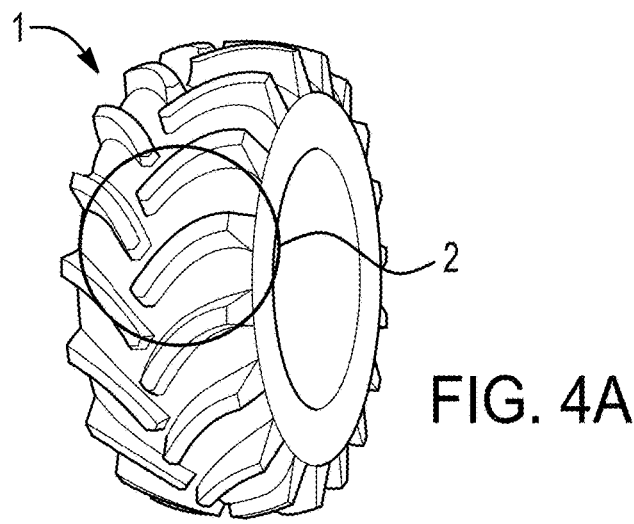
FIG. 4A shows the portion of a tire illustrated in FIGS. 4B-4G.
Figure 4B:
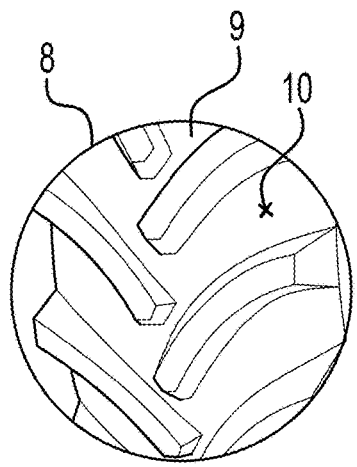
FIG. 4B shows a frontal view of a tire with a puncture or slice in the treaded area of the tire.
Figure 4C:
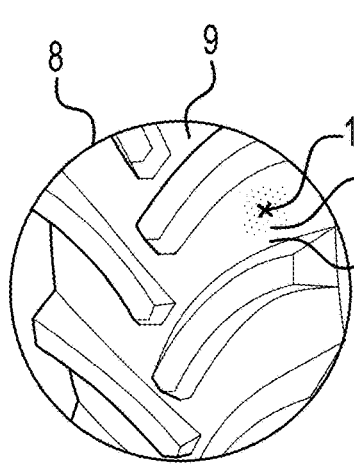
FIG. 4C shows where to apply the adhesive for a rectangular patch to repair a slice or puncture in the treaded area of the tire.
Figure 4D:
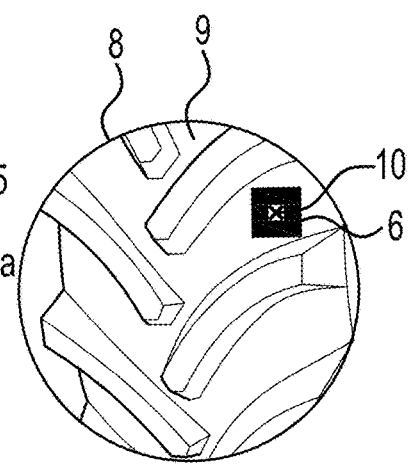
FIG. 4D shows where to place a rectangular patch to repair a slice or puncture in the treaded area of the tire.

FIG. 4A shows a tire 1 and a viewing area 8. Viewing area 8 is shown in sequential FIGS. 4B-4D and 4E-4G. In FIG. 4B treaded area 9 is punctured or sliced at point 10. FIG. 4C shows the treaded area 9 as punctured or sliced at point 10, and adhesive 5 is applied at area 5a in a pattern later described in FIG. 5. In FIG. 4D the treaded area puncture or slice 10 is covered with rectangular external patch 6.

Figure 4E:
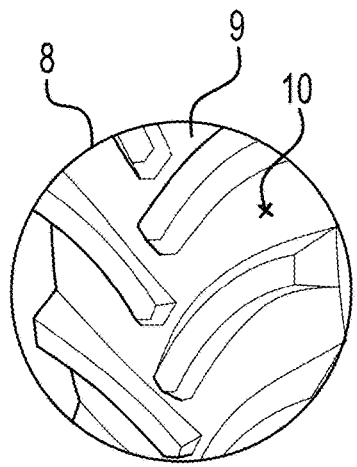
FIG. 4E shows a frontal view of a tire with a puncture or slice in the treaded area of the tire.
Figure 4F:
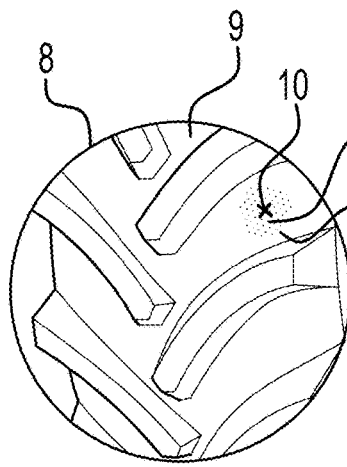
FIG. 4F shows where to apply the adhesive for a circular patch to repair a slice or puncture in the treaded area of the tire.
Figure 4G:
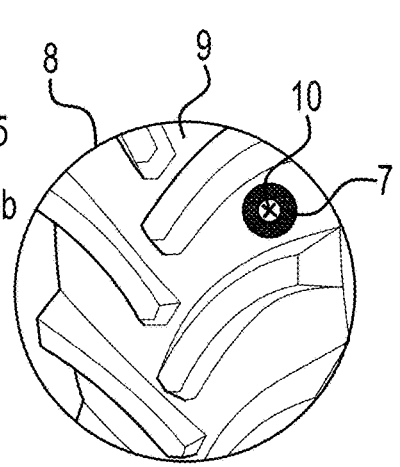
FIG. 4G shows where to place a circular patch to repair a slice or puncture in the treaded area of the tire.

FIG. 4E shows a treaded area 9 that is punctured or sliced at point 10. In FIG. 4F treaded area 9 is punctured or sliced at point 10, and adhesive 5 is applied at area 5b in a pattern later described in FIG. 6. In FIG. 4G the treaded area puncture or slice 10 is covered with a circular external patch 7.

Figure 5:
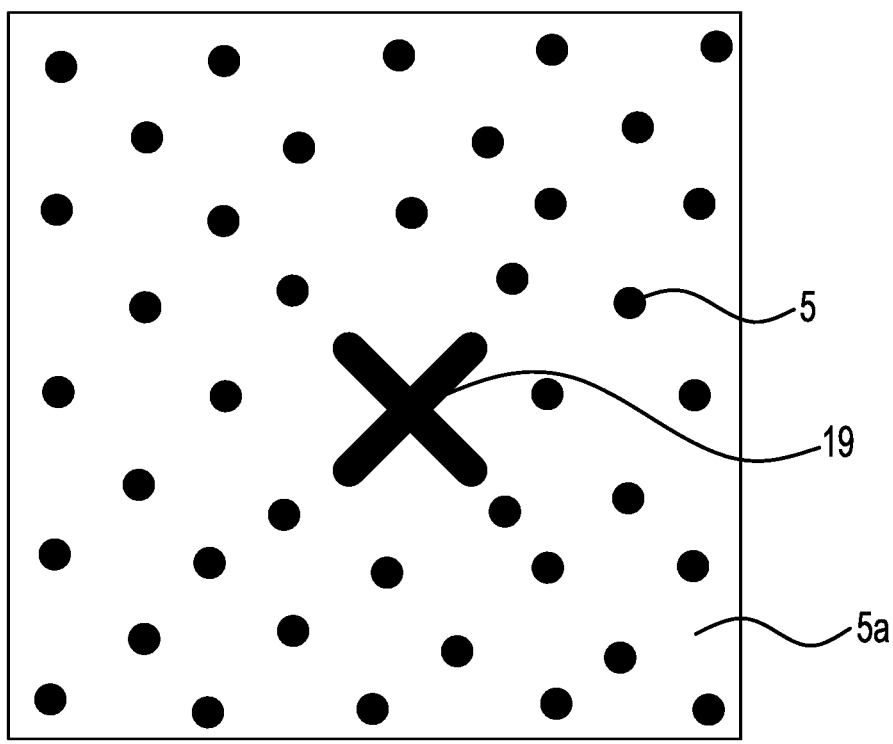
FIG. 5 shows the staggered pattern that adhesive should be applied to the damaged area of the tire before the rectangular external patch is placed on the tire carcass.
Figure 6:
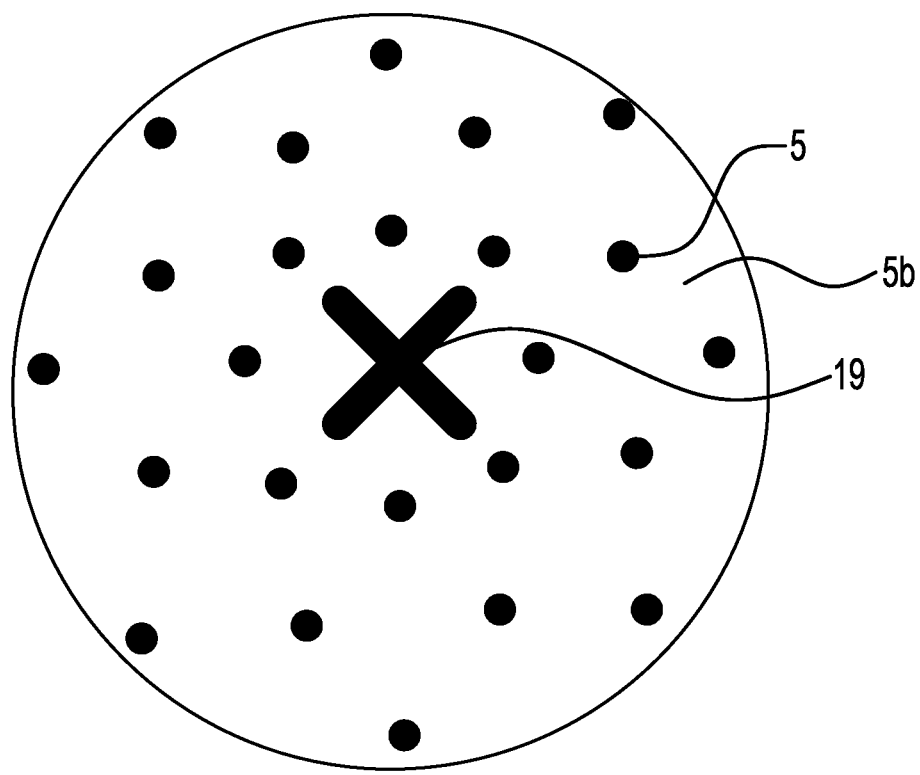
FIG. 6 shows the staggered pattern that adhesive should be applied to the damaged area of the tire before the circular external patch is placed on the tire carcass.
Figure 7A:
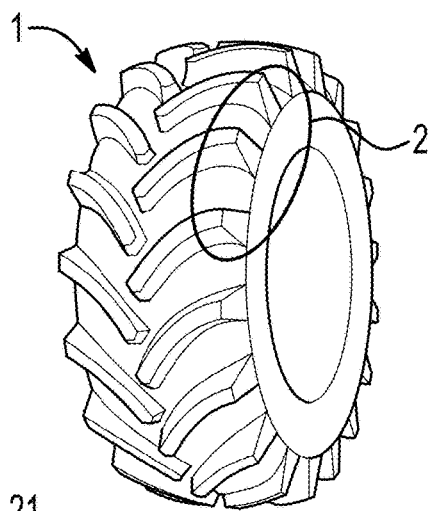
FIG. 7A shows the portion of the tire illustrated further in FIGS. 7B and 7C.
Figure 7B:
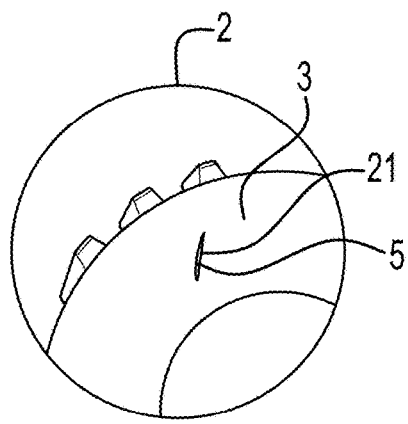
FIG. 7B shows a slice in the sidewall of a tire.
Figure 7C:
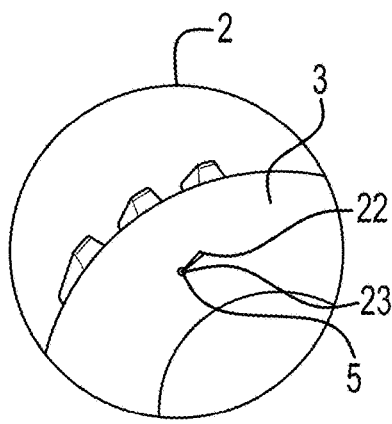
FIG. 7C shows a puncture in the sidewall of a tire.
Figure 8A:
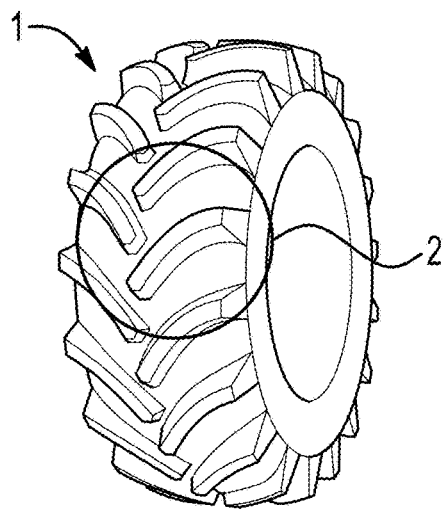
FIG. 8A shows the portion of the tire illustrated in FIGS. 7B and 7C.
Figure 8B:
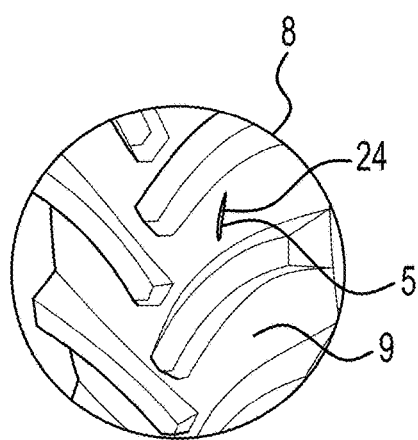
FIG. 8B shows a slice in the treaded area of the tire.
Figure 8C:
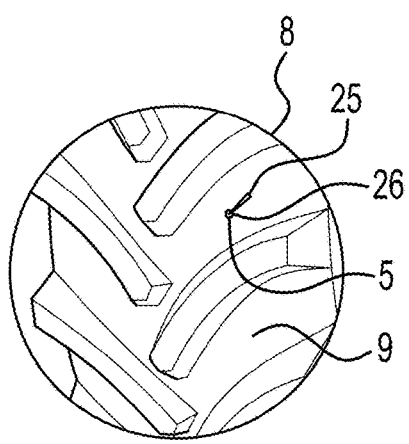
FIG. 8C shows a puncture in the treaded area of the tire.

FIG. 5 adhesive 5 is applied in area 5.1 in a staggered pattern as shown surrounding slice or puncture 19 with 15-40 drops of the adhesive 5 per a single 1.5 inch×1.5 inch patch (6-18 drops per square inch). Referring to FIG. 6 adhesive 5 is applied in area 5.2 in a staggered pattern as shown surrounding slice or puncture 19 with 15-40 drops of the adhesive 5 per a single 1.5 inch×1.5 inch patch (6-18 drops per square inch). The adhesive 5 may be put on the tire first, or may be put on the patch first.

Other ranges of dots (drops) are possible for a 1.5 inch×1.5 inch patch, such as 15-60 drops for such a patch (6-27 drops per square inch), 15-50 drops for such a patch (6-22 drops per square inch), 30-60 drops for such a patch (13-22 drops per square inch), 40-60 drops for such a patch (18-27 drops per square inch), or 45-55 drops for such a patch (20-24 drops per square inch).

The term "drops," as used herein, refers to placement of discrete amounts of adhesive in a small area. Applicator tips with openings of suitable size may be used to provide controllable placement of adhesive drops of desired size in desired locations (or with desired spacing). Example volumes for drops may range from 0.00009-0.0008 cubic inches, although it will be appreciated that drops of other volumes may be used.

Referring now again to FIG. 1, there is shown an external patch 6 according to an embodiment of the present invention, generally comprised of a tread portion 12, 13 and 14. and an adhesive layer 11. The patch portion 6 is applied to the exterior surface of a vehicle tire and affixed to the exterior surface by the adhesive layer 11, thereby providing an additional strength and allowing the tire to once again hold air pressure.

In the illustrated embodiment, the tread portion 6 has a contact surface 12 on its underside. The adhesive layer 11 is applied to the tire or tread as described in FIG. 5 with dispersed drops of adhesive 5 in a thin layer such that the adhesive layer 11 has a first engagement side 12 in contact with the contact surface of the tire as shown in FIG. 3D.

Referring now again to FIGS. 3A-3D and 4A-4D there is shown a technique for applying the external patch 6 to the vehicle tire 1. Before the patch 6 is placed on the tire 1, adhesive 5 must also be placed in the puncture or slice as shown in FIGS. 7A, 7B, 7C, 8A, 8B and 8C. Once adhesive 5 is placed in the damaged area, adhesive 5 is then placed in a grid pattern around the damage as shown in 3C and 4C and in more detail in FIG. 5. Then, rectangular patch 6 is placed on the adhesive and pressure is held for a certain amount of time. After the given amount of time, generally between 10 and 60 seconds, the patch is left to cure for a longer amount of time. There may be another compound used in this process to speed up the cure time of adhesive 5.

Referring now to FIGS. 3A, 3E-3G, 4A, and 4E-4G, there is shown a technique for applying the external patch 7 to the vehicle tire 1. Before the patch 7 is placed on the tire 1, adhesive 5 must also be placed in the puncture or slice as shown in FIGS. 7A, 7B, 7C, 8A, 8B and 8C. Once adhesive 5 is placed in the damaged area, adhesive 5 is then placed in a grid pattern around the damage as shown in FIGS. 3F and 4F, and in more detail in FIG. 6. Then, rectangular patch 6 is placed on the adhesive and pressure is held for a certain amount of time. After the given amount of time, generally between 10 and 60 seconds, the patch is left to cure for a longer amount of time. There may be another compound used in this process to speed up the cure time of adhesive 5.

In this embodiment, patches 6 and 7 are formed of a standard type of rubber such as conventionally used in the manufacture of vehicle tires. Preferably, the patch portion 6 and 7 can be formed of a rubber material such as ethylene propylene diene monomer (EPDM). Alternatively, polyisoprene can also be used, which is known to have 15% higher tensile strength than EPDM. The preferred embodiment includes polyisoprene having a durometer value of 75 d+/−5 d. It can also be contemplated to use one or more recycled rubber materials. In this embodiment, the adhesive layer 5 is formed of a cyanoacrylate compound. An amount of small drops (or dots) placed on the tire 1 or the patch 6 or 7 contact surface 12 or 16 is found to be sufficient to form a suitable thickness of the adhesive layer 11 and 15. It has been found that approximately 0.1-0.3 grams will bond a single 1.5 inch×1.5 inch patch (0.0444 to 0.133 grams of the adhesive per square inch).

Various sizes of patches may also be used. Patches of 1.5 inches×1.5 inches have already been mentioned. Larger patches, such as 4.5 inch×4.5 inch patches, may also be used. Many other sizes are possible, both between these two sizes, and larger and smaller sizes. Patches may be cut to fit, for example with a knife or with scissors.

For larger patches the patch may be secured to the tire in sections, with adhesive drops used to sequentially secure successive parts of the patch in stages. For example one edge of the patch may be secured first, with adhesive applied in drops and a first part of the patch held in place, then further adhesive applied and a second (adjoining) part of the patch secured, and so forth, until the entire patch is secured.

Cyanoacrylate adhesives are preferable in that they are single component adhesives and do not require an accelerant, as with epoxies. It is to be appreciated that other suitable adhesive materials could also be employed without departing from the invention. While accelerants for faster curing are not necessarily required, they may be used in certain circumstances.

Figure 9:
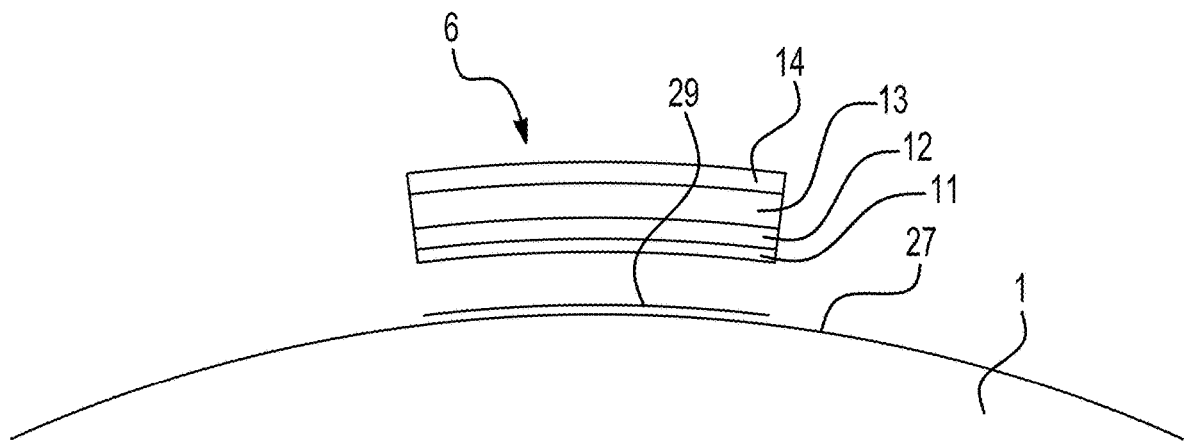
FIG. 9 shows a patch being secured to a tire, according to an embodiment of the invention.

As particularly shown in FIG. 9, the external patch 6 is joined to the tire 1. The adhesive layer 11 may dissolve and merge with the rubber of the exterior surface 27 to form an absorption layer. In such an embodiment the dissolved layer is not uniform throughout the extent of the contact between the patch 6 and the tire. It has been learned from experience that the absorption layer 29 can have greater tensile strength than the rubber material of the patch portion 6 itself. In a particularly aggressive operational environment, it has been found that the tread portion 6 can be damaged or even torn off without disturbing the absorption layer 29. It is concluded that the chemical material of the cyanoacrylate in the adhesive layer 11 combines with the rubber material of the tire 1 to form a matrix stronger than either material.

Figure 10:
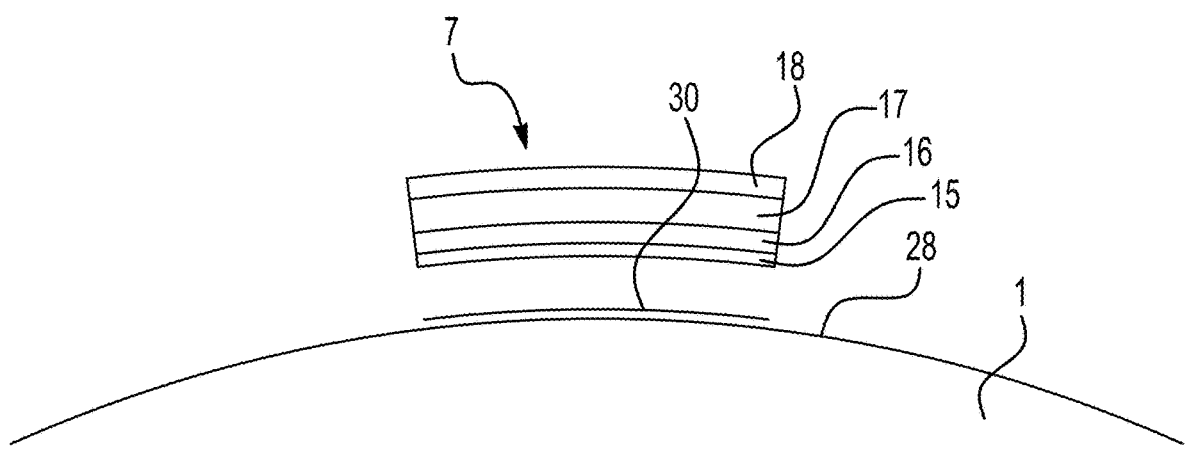
FIG. 10 shows a patch being secured to a tire, according to another embodiment of the invention.

As particularly shown in FIG. 10, the external patch 7 is joined to the tire 1. The adhesive layer 15 dissolves and merges with the rubber of the exterior surface 28 to form an absorption layer. It has been learned from experience that the absorption layer 30 can have greater tensile strength than the rubber material of the patch portion 7 itself. In a particularly aggressive operational environment, it has been found that the tread portion 7 can be damaged or even torn off without disturbing the absorption layer 30. It is concluded that the chemical material of the cyanoacrylate in the adhesive layer 15 combines with the rubber material of the tire 1 to form a matrix stronger than either material.

In an embodiment of the present invention, it is shown that the thickness of the patch 6 or 7 is most effective at approximately ⅛ inch thick, such as having a thickness of 1/16 inch to ¼ inch. It may be advantageous for the patch to be thin enough so that it is flexible. Flexibility in the patching material may allow it to conform better to the tire, and form a better seal. The flexibility of the patch may be advantageous in combination with the use of anchor points of adhesive, as described elsewhere herein. The length and width of the patch can vary based on the size of the puncture or slice in the tire. However, it is to be appreciated that any other suitable dimensions of the tread portion 6 or 7 can be used for embodiments of the present invention used for other vehicle tires or types or rubber based on use of the tire in the field.

In a preferred embodiment, the patch portion 6 can be formed as an extrusion exiting from an extrusion die and having a generally rectangular or circular profile in accordance with the aforementioned dimensions. Individual patch portions 6 of sufficient length can be cut off from the extrusion at desired intervals. In this manner, the tread portions 6 can be quickly and inexpensively formed. The tread portions 6 are preferably approximately one inch in extrusion length but can be formed of any suitable extrusion length without departing from the invention.

In a preferred embodiment, the patch portion 7 can be formed as an extrusion exiting from an extrusion die and having a generally circular profile in accordance with the aforementioned dimensions. Individual patch portions 7 of sufficient circumference can be cut off from the extrusion at desired intervals. In this manner, the tread portions 6 can be quickly and inexpensively formed. The tread portions 7 are preferably approximately ⅛ in extrusion length but can be formed of any suitable extrusion length without departing from the invention.

A method is contemplated of repairing a tire of a vehicle tire, such as for repairing the sidewall of a tire. This method can be employed in the field to repair a worn, damaged, sliced or punctured tire. After the patch is applied, the tire is once again inflated for an off-road vehicle such as an ATV, golf cart, off-road motorcycle, or a work vehicle such as a tractor, combine or front end loader.

The method includes an initial step of cleaning an area on an exterior surface of a tire tread of a vehicle tire. The cleaning can be a simple wash and wipe operation to simply remove mud, dirt and debris from the area, in order to allow adequate adhesion. The cleaning preferably includes cleaning a patch where the tire tread is worn, damaged, punctured or sliced thereby requiring an additional support to hold air in the carcass of the tire.

The method also includes a step of sanding the area around the puncture or slice to ensure a smooth surface maximizing rubber to rubber contact between the tire 1 and the patch 6 or 7 with a layer of adhesive 5 between them.

The adhesive layer may be a discontinuous layer, even after pressure has been applied. The drops or dots of the adhesive 5 may flatten out somewhat to form a serious of discrete anchor points between the patch and the tire surface, with each of the drops forming a respective separate anchor point, and with rubber-rubber patch-tire contact (adhesive-less space) between adjacent of the anchor points. It has been found that the rubber-rubber contact provides important sealing between the patch and the tire surface, with the anchor points corresponding to the drops of the adhesive 5 providing anchoring of the patch to the surface of the tire. It has been found that the formation of discrete anchor points, as opposed to the formation of a continuous adhesive layer, may help avoid brittleness and cracking in the connection between the patch and the tire. This may provide for better sealing capability.

In addition, the spacing of the dots or drops of adhesive may allow for faster and more consistent curing of the adhesive. The drops of adhesive and/or the resulting anchor points may cover 30-50% (or more broadly 20-60%) of the area between the patch and the tire surface that is covered by the patch.

Cleaning an area on an exterior surface of a tire tread of a vehicle tire. The cleaning can be a simple wash and wipe operation to simply remove mud, dirt and debris from the area, in order to allow adequate adhesion. The cleaning preferably includes cleaning a patch where the tire tread is worn, damaged, punctured or sliced thereby requiring an additional support to hold air in the carcass of the tire.

A kit may be used to carry out the above method. For example such a kit may include suitable adhesive, such as a tube of suitable adhesive, and suitable patching material. Instructions for properly carrying out the method may also be provided. The kit may include other items used in the tire repair, such as sandpaper and/or applicator tips for applying the adhesive.

In the aforementioned manner, the present invention provides a method and apparatus for enabling tires being worn, damaged, punctured sliced, or ripped, but otherwise remaining intact to be repaired in the field of operation. The damaged tire can be quickly and inexpensively repaired by the vehicle operator. This can result in maintaining safety for the vehicle operator and recovery of the vehicle from a remote location. For vehicles used at job sites, the invention can also result in a rapid return of a working vehicle to the field of operation, and prevent losses incurred from down time, in addition to many other benefits.

In addition to the foregoing benefits, the present invention can also extend the useful life of existing vehicle tires, resulting in a savings of costs of new or retreaded tires, and the additional material and labor costs of remounting associated therewith. Further, the invention reduces scrapping of old tires and thereby conserves the consumption of rubber resources required for producing new or retreaded tires. The present invention also reduces the volume of discarded old tires added landfills, reducing ongoing environmental problems.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of repairing a tire comprises:
    applying drops of adhesive around a damaged area of the tire on an external surface of the tire, or on a patch;
    after the applying, placing the patch on the damaged area, with the drops of adhesive between the patch and the damaged area; and
    after the placing, applying pressure to the patch for at least a predetermined amount of time;
    wherein the applying the drops includes applying discrete drops of the adhesive with adhesiveless area left between adjacent discrete drops.

2. The method of claim 1, wherein the applying the drops includes applying from 0.0444 to 0.133 grams of the adhesive per square inch.

3. The method of claim 1, wherein the applying the drops includes applying the drops such that 15-40 drops are used per a 1.5 inch×1.5 inch area (6-18 drops per square inch).

4. The method of claim 1, wherein the applying the drops includes applying the drops such that 40-60 drops are used per a 1.5 inch×1.5 inch area (18-27 drops per square inch).

5. A method of repairing a tire comprises:
    applying drops of adhesive around a damaged area of the tire on an external surface of the tire, or on a patch;
    after the applying, placing the patch on the damaged area, with the drops of adhesive between the patch and the damaged area; and
    after the placing, applying pressure to the patch for at least a predetermined amount of time;
    wherein the applying the drops includes applying the drops in a grid pattern.

6. The method of claim 1, wherein the patch is a flexible patch.

7. The method of claim 1, wherein the patch is a rubber material patch.

8. The method of claim 7, wherein the rubber material patch has a thickness of $\frac{1}{16}$ inch to $\frac{1}{4}$ inch.

9. The method of claim 7, wherein the rubber material patch includes polyisoprene.

10. The method of claim 1, wherein the placing and the applying pressure includes forming an adhesive layer between the tire and the patch, from the drops of the adhesive.

11. The method of claim 10, wherein the placing and the applying pressure includes dissolving and merging the adhesive layer with rubber of the external surface to form an absorption layer.

12. A method of repairing a tire comprises:
    applying drops of adhesive around a damaged area of the tire on an external surface of the tire, or on a patch;
    after the applying, placing the patch on the damaged area, with the drops of adhesive between the patch and the damaged area; and
    after the placing, applying pressure to the patch for at least a predetermined amount of time,
    wherein the forming the adhesive layer includes forming a series of discrete anchor points between the patch and the tire, with the anchor points corresponding to respective of the drops, and with adhesiveless space between adjacent discrete anchor points.

13. The method of claim 1, further comprising, before the applying the drops of the adhesive, cleaning the damaged area.

14. The method of claim 1, further comprising, before the applying the drops of the adhesive, sanding the damaged area.

15. The method of claim 1, further comprising, before the placing the patch, applying additional adhesive in the damaged area.

16. The method of claim 1, wherein the damaged area is a sidewall area of the tire.

17. The method of claim 1, wherein the damaged area is a treaded area of the tire.

18. The method of claim 1, wherein the applying the adhesive includes applying a cyanoacrylate compound.

19. The method of claim 5, wherein the applying the adhesive includes applying a cyanoacrylate compound.

20. The method of claim 12, wherein the applying the adhesive includes applying a cyanoacrylate compound.

\* \* \* \* \*